US008443105B1

(12) United States Patent
Finkler et al.

(10) Patent No.: US 8,443,105 B1
(45) Date of Patent: May 14, 2013

(54) DEVICE FOR AND METHOD OF NETWORK ROUTING

(75) Inventors: Todd B. Finkler, Crofton, MD (US); Mark A. Shayman, Potomac, MD (US)

(73) Assignee: The United States of America as Represented by the Director, National Security Agency, Washington, DC (US)

( * ) Notice: Subject to any disclaimer, the term of this patent is extended or adjusted under 35 U.S.C. 154(b) by 50 days.

(21) Appl. No.: 13/374,638

(22) Filed: Dec. 12, 2011

(51) Int. Cl.
*G06F 15/173* (2006.01)

(52) U.S. Cl.
USPC ........... 709/238; 370/254; 370/351; 370/352; 709/239; 709/240; 709/241; 709/242

(58) Field of Classification Search ............... 709/238
See application file for complete search history.

(56) References Cited

U.S. PATENT DOCUMENTS

| | | | | |
|---|---|---|---|---|
| 6,055,561 | A * | 4/2000 | Feldman et al. | 709/200 |
| 6,314,093 | B1 * | 11/2001 | Mann et al. | 370/351 |
| 6,509,898 | B2 * | 1/2003 | Chi et al. | 345/440 |
| 6,981,055 | B1 * | 12/2005 | Ahuja et al. | 709/238 |
| 7,296,087 | B1 * | 11/2007 | Ashwood Smith | 709/238 |
| 7,554,996 | B2 * | 6/2009 | Previdi et al. | 370/401 |
| 7,639,662 | B1 * | 12/2009 | Young | 370/345 |
| 7,693,064 | B2 | 4/2010 | Thubert et al. | |
| 7,843,834 | B2 | 11/2010 | Picard | |
| 8,160,056 | B2 * | 4/2012 | Van der Merwe et al. | 370/351 |
| 2006/0002368 | A1 * | 1/2006 | Budampati et al. | 370/351 |
| 2006/0291446 | A1 * | 12/2006 | Caldwell et al. | 370/351 |
| 2007/0245034 | A1 * | 10/2007 | Retana et al. | 709/238 |
| 2012/0173758 | A1 * | 7/2012 | Flammer et al. | 709/238 |
| 2013/0013809 | A1 * | 1/2013 | Vasseur et al. | 709/239 |

OTHER PUBLICATIONS

Li Xia et al., An Improved AODV Routing Protocol Based on the Congestion Control and Routing Repair Mechanism, 2009 Int. Conf. on Communications & Mobile Computing, pp. 256-262, IEEE, 2009.
Yung Yi et al., Hop-by-Hop Congestion Control Over a Wireless Multi-Hop Network, 12 pgs., Proceedings of IEEE, Hong Kong, Mar. 2004.

* cited by examiner

*Primary Examiner* — Tauqir Hussain
(74) *Attorney, Agent, or Firm* — Robert D. Morelli

(57) ABSTRACT

A device and method of routing traffic in a network by receiving the network, assigning a maximum temperature value to gateway nodes, calculating temperature values for router nodes, determining self-utilization values for nodes, determining neighborhood-utilization values for router nodes, determining pressure values for gateway nodes, determining pressure values for router nodes, identifying router node sent traffic, identifying neighboring nodes having higher temperatures than router node, identifying neighboring node with lowest pressure value, sending traffic to neighboring node with lowest pressure value, and stopping if the neighboring node is a gateway node, otherwise identifying the node as a router node and returning to the step of finding neighboring nodes.

4 Claims, 3 Drawing Sheets

DEVICE FOR AND METHOD OF NETWORK ROUTING

FIELD OF INVENTION

The present invention relates, in general, to multiplex communications and, in particular, to flow control of data transmission through a network.

BACKGROUND OF THE INVENTION

Devices in a network may communicate with each other via hardwired transmission lines or over the air radio frequency (RF) transmission. Networks that communicate via RF transmission are referred to as wireless networks. Mobile devices communicate via numerous RF transmissions points commonly referred to as cells, where the mobile wireless network is commonly referred to as a wireless mesh network.

Mobile devices not only communicate with each other but can also be used to access the Internet. In a wireless mesh network, there are devices that provide access to the Internet, which are commonly referred to as access points or gateways, and there are device that merely route communication (i.e., traffic) to gateways, which are commonly referred to as routers of mobile nodes. With increased use of mobile devices, there is a need to route traffic in the most efficient manner.

In an article entitled "HEAT: Scalable Routing in Wireless Mesh Networks Using Temperature Fields," by Rainer Baumann et al., *Worlds of Wireless, Mobile and Multimedia Networks*, June 2007, a method was disclosed to assign a value referred to as a temperature to each mobile node, where gateways are assigned the maximum value and each mobile node is assigned a value that is a function of the values of all of its neighbors and a conductivity value. Therefore, the mobile nodes with more neighbors (i.e., more connections), tend to have higher temperatures than mobile nodes with fewer connections. Routing of mobile communications then proceeds from mobile nodes with lower temperatures to mobiles nodes with higher temperatures, always choosing the hottest node when routing, until the hottest mobile node (i.e., a gateway) is reached. Since mobile nodes with more connections tend to carry the most traffic and hence are the most congested, there is a need for a device and method that considers traffic congestion in determining routing in a mobile mesh network. The present invention is such a device and method.

In an article entitled "An Improved AODV Routing Protocol Based on the Congestion Control and Routing Repair Mechanism," by Li Xia et al., 2009 *International Conference on Communications and Mobile Computing*, IEEE Computer Society, an improved AODV routing protocol for mobile ad-hoc networks (MANETs) named AODV-I was disclosed.

In an article entitled "Hop-by-hop Congestion Control over a Wireless Multi-hop Network," by Yung Yi et al., 2009 *International Conference on Communications and Mobile Computing*, Proceeding of the IEEE Infocom, Hong Kong, March 2004, an algorithm to control congestion in multi-hop wireless networks.

U.S. Pat. No. 6,314,093, entitled "TRAFFIC ROUTE FINDER IN COMMUNICATIONS NETWORK," discloses a route finder means that associates a cost to each network link. U.S. Pat. No. 6,314,093 is hereby incorporated by reference into the specification of the present invention.

U.S. Pat. No. 6,509,898, entitled "USAGE BASED METHODS OF TRAVERSING AND DISPLAYING GENERALIZED GRAPH STRUCTURES," discloses a method of generating a tree structure representation of a generalized graph structure for display that includes the more important links in the representation. U.S. Pat. No. 6,509,898 is hereby incorporated by reference into the specification of the present invention.

U.S. Pat. No. 7,639,662, entitled "QUALITY OF SERVICE CONGESTION METRICS PROPAGATED USING ROUTING UPDATES SYSTEM AND METHOD," discloses a device for and method of generating congestion metric information based on the utilization of a link to each of its neighbors. U.S. Pat. No. 7,639,662 is hereby incorporated by reference into the specification of the present invention.

U.S. Pat. No. 7,693,064, entitled "FORWARDING PACKETS TO A DIRECTED ACYCLIC GRAPH DESTINATION USING LINK SELECTION BASED ON RECEIVED LINK METRICS," discloses a method that utilizes path performance metrics. U.S. Pat. No. 7,693,064 is hereby incorporated by reference into the specification of the present invention.

U.S. Pat. No. 7,843,834, entitled "USE OF MINIMAL PROPAGATION DELAY PATH TO OPTIMIZE A MESH NETWORK," discloses a method that utilizes a minimal propagation delay path to optimize a mesh network. U.S. Pat. No. 7,843,834 is hereby incorporated by reference into the specification of the present invention.

SUMMARY OF THE INVENTION

It is an object of the present invention to route traffic in a mobile mesh network.

It is another object of the present invention to route traffic in a mobile mesh network as a function of node type, temperature value, and pressure value, where pressure value is a function of utilization value.

The present invention is a device for and a method of routing traffic in a mobile mesh network from a router node to a gateway node and vice versa.

The device and method each implement a method where the first step is receiving a graph of a mesh network, where the network includes at least one node of a first type and at least one node of a second type, where the node of the first type is a router node, where the node of the second type is a gateway node, and where nodes are neighbors if they can communicate with each other.

The second step implemented by the device and method is assigning a maximum user-definable temperature value to each gateway node.

The third step implemented by the device and method is calculating a temperature for each router node, where the temperature value for each router node is the highest temperature of a neighboring node times a user-definable conductivity value.

The fourth step implemented by the device and method is determining a self-utilization value for each router node and each gateway node, where the self-utilization value for each node (i.e., each router node and each gateway node) is a user-definable percentage of the total time that the node spends transmitting, receiving, and waiting because a neighboring node of the node in question is transmitting.

The fifth step implemented by the device and method is determining a neighborhood-utilization value for each router node, where the neighborhood-utilization value for each router node is a maximum of the router node's self-utilization value and the self-utilization values of all of its neighboring nodes (i.e., each neighboring router node and each neighboring gateway node, if any).

The sixth step implemented by the device and method is determining a pressure value for each gateway node, where the pressure value for each gateway node is the gateway node's self-utilization value.

The seventh step implemented by the device and method is determining a pressure value for each router node, where the pressure value for each router node is a function of the router node's neighborhood-utilization value and the pressure values of the router node's neighboring nodes that have higher temperature values than the router node's temperature value. First, for each router node, identifying the router node's neighboring nodes that have higher temperature values than the router node's temperature value. Second, identifying pressure values associated with such neighboring nodes. Third, identifying the minimum of the identified pressures values. Fourth, comparing the minimum pressure value identified to the router node's neighborhood-utilization value. Fifth, if the router node's neighborhood-utilization value is greater than or equal to the minimum of the identified pressure values then setting the router node's pressure value to the router node's neighborhood-utilization value. Sixth, if the minimum of the identified pressure values is greater than the router node's neighborhood-utilization value then setting the router node's pressure value to the minimum of the identified pressure values.

The eighth step implemented by the device and method is identifying a router node that was sent traffic from a mobile device.

The ninth step implemented by the device and method is identifying each node in the mesh network that is a neighbor node of the router node identified in the last step that has a higher temperature than the router node.

The tenth step implemented by the device and method is identifying the node identified in the ninth step that has the lowest pressure value.

The eleventh step implemented by the device and method is sending traffic from the router node involved in the ninth step to the node identified in the tenth step.

The twelfth step implemented by the device and method is stopping if the node to which traffic was sent in the eleventh step is a gateway node. Otherwise, identifying the node identified in the tenth step as a router node and returning to the ninth step.

DETAILED DESCRIPTION

The present invention is a device for and a method of routing traffic in a mobile mesh network from a router node to a gateway node.

Figure 1:
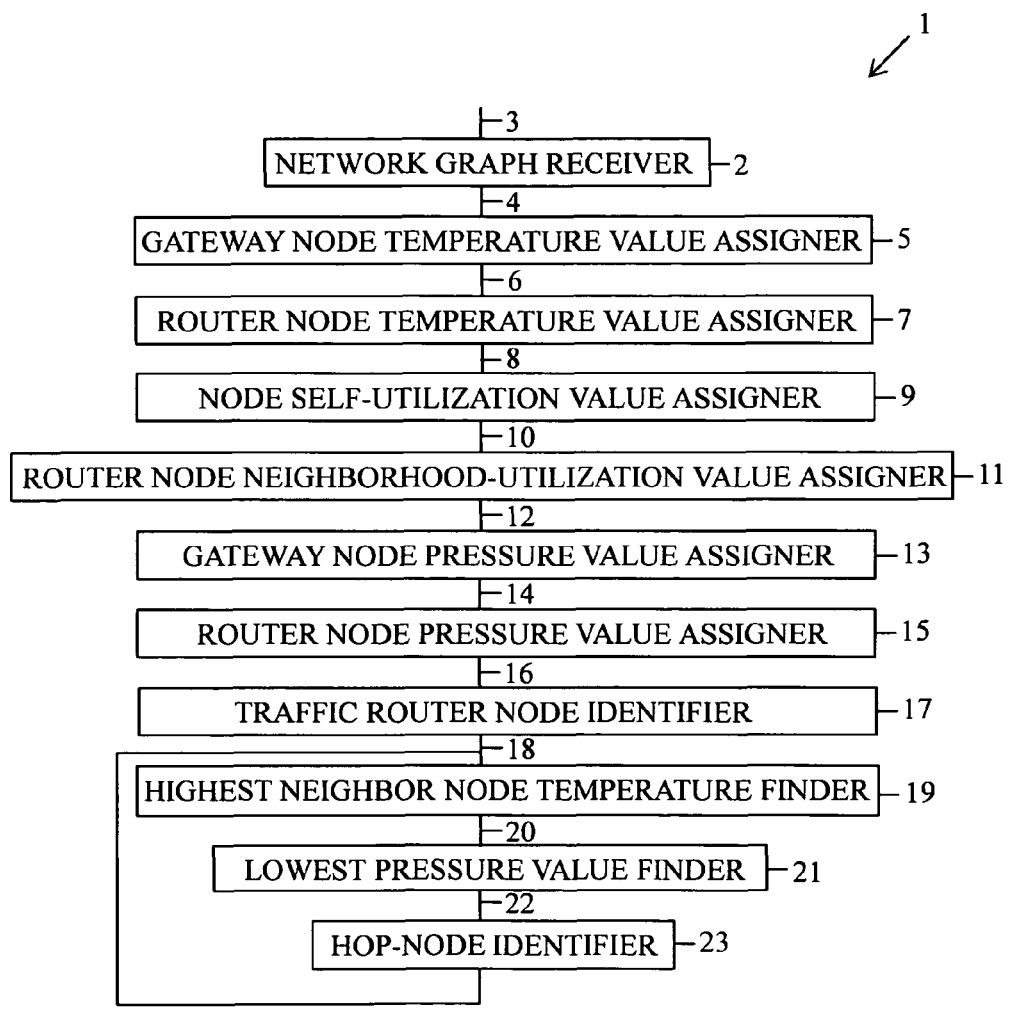
FIG. 1 is a schematic of the device of the present invention.

FIG. 1 is a schematic of the preferred device 1 of the present invention.

The device 1 includes a network-graph receiver 2 for receiving a graph of a mesh network, where the network includes at least one node of a first type and at least one node of a second type, where the node of the first type is a router node, where the node of the second type is a gateway node, and where nodes are neighbors if they can communicate with each other. The network-graph receiver 2 has an input 3 and has an output 4.

The device 1 also includes a gateway node temperature value assigner 5 for assigning a maximum user-definable temperature value to each gateway node. The gateway node temperature value assigner 5 has an input connected to the output 4 of the network graph receiver 2 and has an output 6.

The device 1 also includes a router node temperature value assigner 7 for calculating a temperature for each router node, where the temperature value for each router node is the highest temperature of a neighboring node times a user-definable conductivity value. The router node temperature value assigner 7 has an input connected to the output 6 of the gateway node temperature value assigner 5 and has an output 8.

The device 1 also includes a node self-utilization value assigner 9 for determining a self-utilization value for each node (i.e., each router node and each gateway node), where the self-utilization value for each node (i.e., each router node and each gateway node) is a user-definable percentage of a total time that the node spends transmitting, receiving, and waiting because a neighboring node is transmitting. The node self-utilization value assigner 9 has an input connected to the output 8 of the router node temperature value assigner 7 and has an output 10.

The device 1 also includes a router node neighborhood-utilization value assigner 11 for determining a neighborhood-utilization value for each router node, where the neighborhood-utilization value for each router node is a maximum of the router node's self-utilization value and the self-utilization values of all of its neighboring nodes (i.e., each router node and each gateway node, if any, that is a neighbor node of the router node for which a neighborhood-utilization value is being assigned). The router node neighborhood-utilization value assigner 11 has an input connected to the output 10 of the node self-utilization value assigner 9 and has an output 12.

The device 1 also includes a gateway node pressure value assignor 13 for determining a pressure value for each gateway node, where the pressure value for each gateway node is the gateway node's self-utilization value. The gateway node pressure value assignor 13 has an input connected to the output 12 of the router node neighborhood-utilization value assigner 11 and has an output 14.

The device 1 also includes a router node pressure value assigner 15 for determining a pressure value for each router node, where the pressure value for each router node is a function of the router node's neighborhood-utilization value and the pressure values of the router's neighboring nodes that have higher temperature values than the router node's temperature value. First, for each router node, identifying the router node's neighboring nodes that have higher temperature values than the router node's temperature value. Second, identifying pressure values associated with such neighboring nodes. Third, identifying the minimum of the identified pressures values. Fourth, comparing the minimum pressure value identified to the router node's neighborhood-utilization value. Fifth, if the router node's neighborhood-utilization value is greater than or equal to the minimum of the identified pressure values then setting the router node's pressure value to the router node's neighborhood-utilization value. Sixth, if the minimum of the identified pressure values is greater than the router node's neighborhood-utilization value then setting the router node's pressure value to the minimum of the identified pressure values. The router node pressure value assigner 15 has an input connected to the output 14 of the gateway node pressure value assigner 13 and has an output 16.

The device 1 includes a traffic router node identifier 17 for identifying a router node that was sent traffic from a mobile device. The traffic router node identifier 17 has an input connected to the output 16 of the router node pressure value assigner 15 and has an output 18.

The device 1 includes a highest neighbor node temperature finder 19 for identifying each node in the mesh network that is a neighbor node of the router node identified in the last step that has a higher temperature than the router node. The highest neighbor node temperature finder 19 has an input bus connected to the output 18 of the traffic router node identifier 17 and has an output 20.

The device 1 includes a lowest pressure value finder 21 for identifying the node identified by the highest neighbor node temperature finder 19 that has the lowest pressure value. The lowest pressure value finder 21 has an input connected to the output 20 of the highest neighbor node temperature finder 19 and has an output 22.

The device 1 includes a hop-node identifier 23 for sending traffic from the router node identified by the traffic router node identifier 17 to the node identified by the lowest pressure value finder 21. The hop-node identifier 23 has an input connected to the output 22 of the lowest pressure value finder 21 and has an output connected to the input bus of the highest neighbor node temperature finder 19. If the node to which traffic was sent is a gateway node then the device stops. Otherwise, the node identified by the lowest pressure value finder is a router node and operation of the device 1 returns to the highest neighbor node temperature finder 19.

Figure 2:
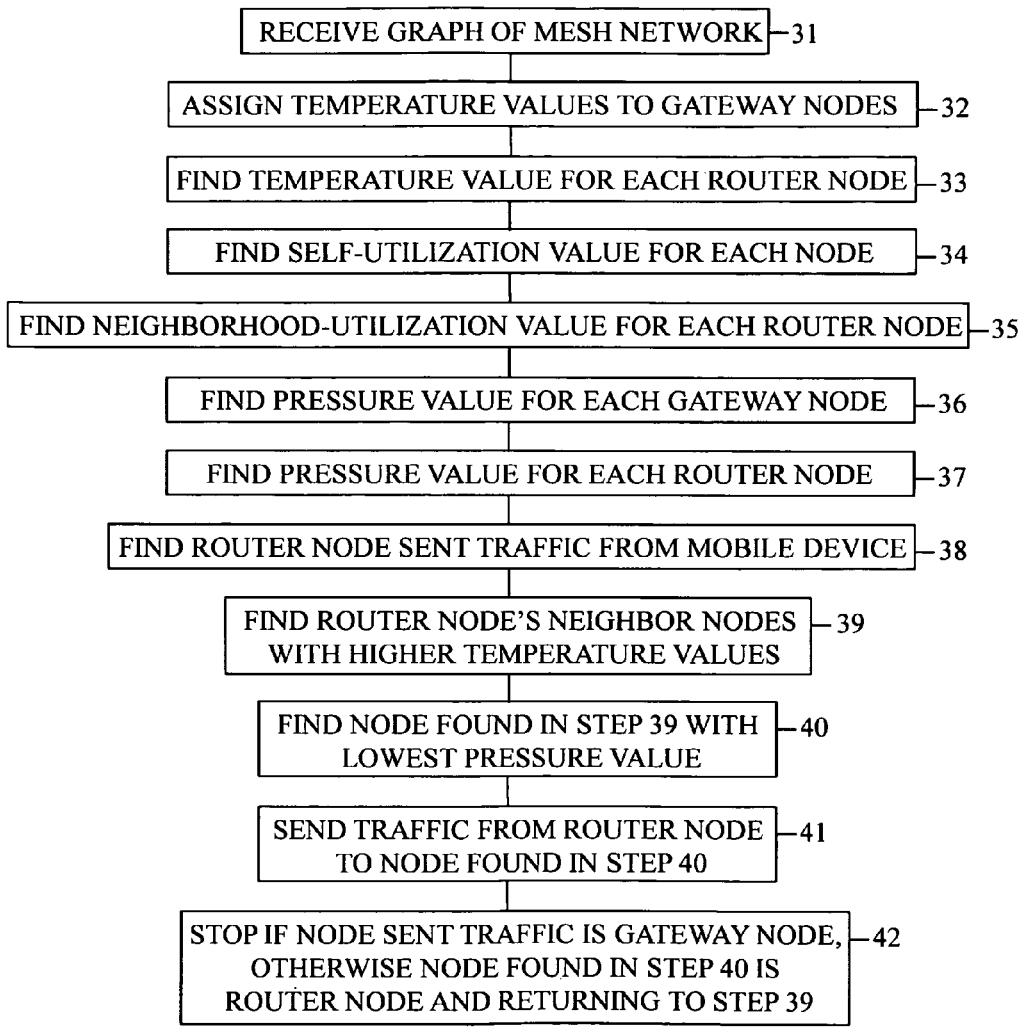
FIG. 2 is a flow-chart of the method of the present invention.

FIG. 2 is a flow-chart of the method of the present invention.

The first step 31 of the method is receiving a graph of a mesh network, where the network includes at least one node of a first type and at least one node of a second type, where the node of the first type is a router node, where the node of the second type is a gateway node, and where nodes are neighbors if they can communicate with each other.

The second step 32 of the method is assigning a maximum user-definable temperature value to each gateway node.

The third step 33 of the method is calculating a temperature for each router node, where the temperature value for each router node is the highest temperature of a neighboring node times a user-definable conductivity value.

The fourth step 34 of the method is determining a self-utilization value for each node (i.e., each router node and each gateway node), where the self-utilization value for each node (i.e., each router node and each gateway node) is a user-definable percentage of a total time that the node spends transmitting, receiving, and waiting because a neighboring node of the node in question is transmitting.

The fifth step 35 of the method is determining a neighborhood-utilization value for each router node, where the neighborhood-utilization value for each router node is a maximum of the router node's self-utilization value and the self-utilization values of all of its neighboring nodes (i.e., each neighboring router node and each neighboring gateway node, if any).

The sixth step 36 of the method is determining a pressure value for each gateway node, where the pressure value for each gateway node is the gateway node's self-utilization value.

The seventh step 37 of the method is determining a pressure value for each router node, where the pressure value for each router node is a function of the router node's neighborhood-utilization value and pressure values of the router node's neighboring nodes that have higher temperature values than the router node's temperature value. First, for each router node, identifying the router node's neighboring nodes that have higher temperature values than the router node's temperature value. Second, identifying pressure values associated with such neighboring nodes. Third, identifying the minimum of the identified pressures values. Fourth, comparing the minimum pressure value identified to the router node's neighborhood-utilization value. Fifth, if the router node's neighborhood-utilization value is greater than or equal to the minimum identified pressure value then setting the router node's pressure value to the router node's neighborhood-utilization value. Sixth, if the minimum identified pressure value is greater than the router node's neighborhood-utilization value then setting the router node's pressure value to the minimum identified pressure value.

The eighth step 38 of the method is identifying a router node that was sent traffic from a mobile device.

The ninth step 39 of the method is identifying each node in the mesh network that is a neighbor node of the router node identified in the last step (which would be the ninth step 39 for the first pass through the method and would be the twelfth step 42 described below for any subsequent pass through the method) that has a higher temperature than the router node.

The tenth step 40 of the method is identifying the node identified in the ninth step 39 that has the lowest pressure value.

The eleventh step 41 of the method is sending traffic from the router node involved in the ninth step 39 to the node identified in the tenth step 40.

The twelfth step 42 of the method is stopping if the node to which traffic was sent in the eleventh step 41 is a gateway node. Otherwise, identifying the node identified in the tenth step 40 as a router node and returning to the ninth step 39.

Figure 3:
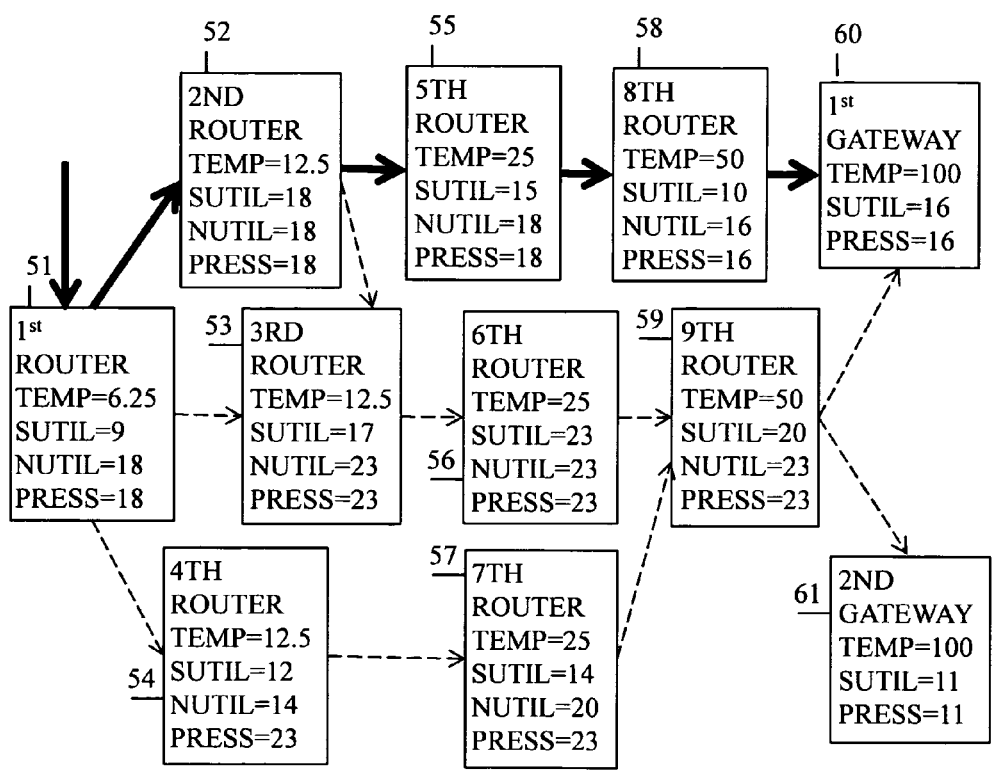
FIG. 3 is an illustration of the operation of the present invention.

FIG. 3 is an illustration of the operation of the present device 1 of FIG. 1 and the method of FIG. 2.

In FIG. 3, a mobile mesh network is received having a first router node 51, a second router node 52, a third router node 53, a fourth router node 54, a fifth router node 55, a sixth router node 56, a seventh router node 57, an eighth router node 58, a ninth router node 59, a first gateway node 60, and a second gateway node 61. A line between two nodes indicates that those nodes can communicate with each other and are, therefore, neighboring nodes. That is, the first router node 51 is connected to the second router node 52, the third router node 53, and the fourth router node 54. The second router node 52 is connected to the first router node 51, the third router node 53, and the fifth router node 55. The third router node 53 is connected to the first router node 51 and the sixth router node 56. The fourth router node 54 is connected to the first router node 51 and the seventh router node 57. The fifth router node 55 is connected to the second router node 52 and the eighth router node 58. The sixth router node 56 is connected to the second router node 52, the third router node 53, and the ninth router node 59. The seventh router node 57 is connected to the fourth router node 54 and the ninth router node 59. The eighth router node 58 is connected to the fifth router node 55 and the first gateway node 60. The ninth router node 59 is connected to the sixth router node 56, the seventh router node 57, the first gateway node 60, and the second gateway node 61. The first gateway node 60 is connected to the eighth router node 58 and the ninth router node 59. The second gateway node 61 is connected to the ninth router node 59.

The first gateway nodes 60 and the second gateway node 61 are each assigned a highest user-definable temperature value (e.g., 100).

The router nodes 51-59 are each assigned a temperature, where the temperature for a router node is the highest temperature of a neighboring node of the router node times a conductivity value (e.g., 0.5). So, working backwards from the first gateway node 60 and the second gateway node 61, the eighth router node 58 and the ninth router node 59 would each have a temperature of 50 (i.e., 100×0.5=50). The fifth router node 55, the sixth router node 56, and the seventh router node 57 would each have a temperature of 25 (i.e., 50×0.5=25). The second router node 52, the third router node 53 and the fourth router node 54 would each have a temperature of 12.5 (i.e., 25×0.5=12.5). The first router node 51 would have a temperature of 6.25 (i.e., 12.5×0.5=6.25).

A self-utilization value for each node (i.e., each router node 51-59 and each gateway node 60,61) is determined, where the self-utilization value for each node (i.e., each router node 51-59 and each gateway node 60,61) is a user-definable percentage of a total time that the node in question spends transmitting, receiving, and waiting because a neighboring node of the node in question is transmitting. For FIG. 3, the self-utilization values (SUTILs) are as follows: 9 for the first router node 51, 18 for the second router node 52, 17 for the third router node 53, 12 for the fourth router node 54, 15 for the fifth router node 55, 23 for the sixth router node 56, 14 for the seventh router node 57, 10 for the eighth router node 58, 20 for the ninth router node 59, 16 for the first gateway node 60, and 11 for the second gateway node 61.

A neighborhood-utilization value for each router node 51-59 is determined, where the neighborhood-utilization value for a router node is the maximum of the router node's self-utilization value and the self-utilization values of all of its neighboring nodes. For FIG. 3, the neighborhood-utilization value for the first router node 51 is 18, because the self-utilization value 18 of the second router node 52 is greater than the first router node's 51 self-utilization value 9 and the self-utilization values 17 and 12 of the first router node's 51 other neighboring nodes (i.e., the third router node 53 and the fourth router node 54, respectively). The neighborhood-utilization value for the second router node 52 is 18, because the self-utilization value 18 of the second router node 52 is greater than the first router node's 51 self-utilization value 9 and the self-utilization values 17 and 15 of the second router node's 52 other neighboring nodes (i.e., the third router node 53 and the fifth router node 55, respectively). The neighborhood-utilization value for the third router node 53 is 23, because the self-utilization value 23 of the sixth router node 56 is greater than the third router node's 51 self-utilization value 17 and the self-utilization values 9 and 18 of the third router node's 53 other neighboring nodes (i.e., the first router node 51 and the second router node 52, respectively). The neighborhood-utilization value for the fourth router node 54 is 14, because the self-utilization value 14 of the seventh router node 57 is greater than the fourth router node's 54 self-utilization value 12 and the self-utilization value 9 of the fourth router node's 54 other neighboring node (i.e., the first router node 51). The neighborhood-utilization value for the fifth router node 55 is 18, because the self-utilization value 18 of the second router node 52 is greater than the fifth router node's 55 self-utilization value 15 and the self-utilization value 10 of the fifth router node's 55 other neighboring node (i.e., the eighth router node 58). The neighborhood-utilization value for the sixth router node 56 is 23, because the self-utilization value 23 of the sixth router node 56 is greater than the self-utilization values 17 and 20 of the sixth router node's 56 other neighboring nodes (i.e., the third router node 53 and the ninth router node 59, respectively). The neighborhood-utilization value for the seventh router node 57 is 20, because the self-utilization value 20 of the ninth router node 59 is greater than the self-utilization value 14 of the seventh router node 57 and the self-utilization value 12 of the seventh router node's 57 other neighboring node (i.e., the fourth router node 54). The neighborhood-utilization value for the eighth router node 58 is 16, because the self-utilization value 16 of the first gateway node 56 is greater than the self-utilization value 10 of the eighth router node 58 and the self-utilization value 15 of the eighth router node's 58 other neighboring node (i.e., the fifth router node 55). The neighborhood-utilization value for the ninth router node 59 is 23, because the self-utilization value 23 of the sixth router node 56 (i.e., a neighboring node of the ninth router node 59) is greater than the self-utilization value 20 of the ninth router node 59 and the self-utilization values 14, 16, and 11 of the ninth router node's 59 other neighboring nodes (i.e., the seventh router node 57, the first gateway node 60, and the second gateway node 61, respectively).

A pressure value for each gateway node 60, 61 is determined, where the pressure value for each gateway node 60, 61 is the self-utilization value of the gateway node 60, 61 in question. Therefore, the pressure value for the first gateway node 60 is 16, because the first gateway node's 60 self-utilization value is 16. The pressure value for the second gateway node 61 is 11, because the second gateway node's 61 self-utilization value is 11.

A pressure value is determined for each router node 51-59, where the pressure value for each router node 51-59 is determined by, first, identifying the router node's neighboring nodes with higher temperatures than the router node. Second, identifying pressure values associated with such neighboring nodes. Third, identifying the minimum of the identified pressures values. Fourth, comparing the minimum pressure value identified to the router node's neighborhood-utilization value. Fifth, if the router node's neighborhood-utilization value is greater than or equal to the minimum identified pressure value then setting the pressure value for the router node to the router node's neighborhood-utilization value. Sixth, if the minimum identified pressure value is greater than the neighborhood-utilization value then setting the pressure value for the router node to the minimum identified pressure value. The pressure value of the first router node 51 is 18, because the first router node's 51 neighborhood-utilization value 18 is equal to the minimum pressure value 18 (i.e., of the second router node 52) of its neighboring nodes (i.e., the second router node 52, the third router node 53, and the fourth router node 54) that have a higher temperature value (i.e., 12.5 for each neighboring node) than the first router node 51 (i.e., 6.25). The pressure value of the second router node 52 is 18, because the second router node's 52 neighborhood-utilization value 18 is equal to the minimum pressure value 18 (i.e., of the fifth router node 55) of its neighboring node (i.e., the fifth router node 55) that has a higher temperature value (i.e., 25) than the second router node 52 (i.e., 12.5). The pressure value of the third router node 53 is 23, because the third router node's 53 neighborhood-utilization value 23 is equal to the minimum pressure value 23 (i.e., of the sixth router node 56) of its neighboring node (i.e., the sixth router node 56) that has a higher temperature value (i.e., 25) than the third router node 53 (i.e., 12.5). The pressure value of the fourth router node 54 is 23, because the minimum pressure value 23 of the fourth router node's 54 neighboring node (i.e., the seventh router node 57) that has a higher temperature value (i.e., 25) than the fourth router node 54 (i.e., 12.5) is greater than the neighborhood-utilization value 14 of the fourth router node 54. The pressure value of the fifth router node 55 is 18, because the fifth router node's 55 neighborhood-utilization value 18 is greater than the minimum pressure value 16 of its neighboring node (i.e., the eighth router node 58) that has a higher temperature value (i.e., 50) than the fifth router node 55 (i.e., 25). The pressure value of the sixth router node 56 is 23, because the sixth router node's 56 neighborhood-utilization value 23 is equal to the minimum pressure value 23 of its neighboring node (i.e., the ninth router node 59) that has a higher temperature value (i.e., 50) than the sixth router node 56 (i.e., 25). The pressure value of the seventh router node 57 is 23, because the minimum pressure value 23 of the seventh router node's 57 neighboring node (i.e., the ninth router node 59) that has a higher temperature value (i.e., 50) than the seventh router node 57 (i.e., 25) is greater than the neighborhood-utilization value 20 of the seventh router node 57. The pressure value of the eighth router node 58 is 16, because the eighth router node's 58 neighborhood-utilization value 16 is equal to the minimum pressure value 16 of its neighboring node (i.e., the first gateway node 60) that has a higher temperature value (i.e., 100) than the eighth router node 58 (i.e., 50). The pressure value of the ninth router node 59 is 23, because the ninth router node's 59 neighborhood-utilization value 23 is greater than the minimum pressure value 11 (i.e., the pressure value 11 of the second gateway node 61 is less than the pressure value 16 of the first gateway node 60) of its neighboring nodes (i.e., the first gateway node 60 and the second gateway node 61) that has a higher temperature value (i.e., 100) than the ninth router node 59 (i.e., 50).

The bolded arrow pointing to the first router node 51 indicates that the first router node 51 was sent traffic from a mobile device.

The nodes in the mesh network that are neighboring nodes of the first router node 51 are the second, third, and forth router nodes 52, 53, 54.

The second router node 52 has the lowest pressure value 18 of the second, third, and fourth router nodes 52, 53, 54.

The traffic received by the first router node 51 is sent to the second router node 52, as indicated by the bolded connection.

Since the second router node 52 is not a gateway node, it is identified as a router node and operation of the method and device continues.

The nodes in the mesh network that are neighboring nodes of the second router node 52 are the third and fifth router nodes 53, 55.

The fifth router node 55 has the lowest pressure value 18 of the third and fifth router nodes 53, 55.

The traffic received by the second router node 52 is sent to the fifth router node 55, as indicated by the bolded connection.

Since the fifth router node 55 is not a gateway node, it is identified as a router node and operation of the method and device continues.

The node in the mesh network that is a neighboring node of the fifth router node 55 is the eighth router node 58.

The eighth router node 58 has the lowest, and only, pressure value 16 of a router node connected to the fifth router node 55.

The traffic received by the fifth router node 55 is sent to the eighth router node 58.

Since the eighth router node 58 is not a gateway node, it is identified as a router node and operation of the method and device continues.

The node in the mesh network that is a neighboring node of the eighth router node 58 is the first gateway node 60.

The first gateway node 60 has the lowest, and only, pressure value 16 of a node connected to the eighth router node 58.

The traffic received by the eighth router node 58 is sent to the first gateway node 60.

Since the first gateway node 60 is a gateway node, operation of the method and device stops.

What is claimed is:

1. A device for routing traffic in a mobile mesh network, comprising:

a) a network-graph receiver for receiving a graph of a mesh network, where the network includes at least one node of a first type and at least one node of a second type, where the node of the first type is a router node, where the node of the second type is a gateway node, and where nodes are neighbors if they can communicate with each other, having an input, and having an output;

b) a gateway node temperature value assigner for assigning a maximum user-definable temperature value to each gateway node, having an input connected to the output of the network graph receiver, and having an output;

c) a router node temperature value assigner for calculating a temperature for each router node, where the temperature value for each router node is the highest temperature of a neighboring node times a user-definable conductivity value, having an input connected to the output of the gateway node temperature value assigner, and having an output;

d) a node self-utilization value assigner for determining a self-utilization value for each router node and each gateway node, where the self-utilization value for each node is a user-definable percentage of a total time that the node spends transmitting, receiving, and waiting while the node's neighboring node is transmitting, having an input connected to the output of the router node temperature value assigner, and having an output;

e) a router node neighborhood-utilization value assigner for determining a neighborhood-utilization value for each router node, where the neighborhood-utilization value for each router node is a maximum of the router node's self-utilization value and the self-utilization values of all of its neighboring nodes, having an input connected to the output of the self-utilization value assigner, and having an output;

f) a gateway node pressure value assignor for determining a pressure value for each gateway node, where the pressure value for each gateway node is the gateway node's self-utilization value, having an input connected to the output of the router node neighborhood-utilization value assigner, and having an output;

g) a router node pressure value assigner for determining a pressure value for each router node, where the pressure value for each router node is a function of the neighborhood-utilization value of the router node and pressure values of the router node's neighboring nodes that have higher temperature values than the router node's temperature value, having an input connected to the output of the gateway node pressure value assigner, and having an output;

h) a traffic router node identifier for identifying a router node that was sent traffic from a mobile device, having an input connected to the output of the router node pressure value assigner, and having an output;

i) a highest neighbor node temperature finder for identifying each node in the mesh network that is a neighbor node of the router node identified in the last operation of the device that has a higher temperature than the router node, having an input bus connected to the output of the traffic router node identifier, and having an output;

j) a lowest pressure value finder for identifying the node identified by the highest neighbor node temperature finder that has the lowest pressure value, having an input connected to the output of the highest neighbor node temperature finder, and having an output;

k) a hop-node identifier for sending traffic from the router node identified by the traffic router node identifier to the node identified by the lowest pressure value finder, having an input connected to the output of the lowest pressure value finder, and having an output connected to the input bus of the output of the highest neighbor node temperature finder, where the device stops if the node to which traffic was sent is a gateway node, otherwise the node identified by the lowest pressure value finder is a router node and operation of the device returns to the highest neighbor node temperature finder.

2. The device of claim 1, wherein said router node pressure value assigner is comprised of a router node pressure value assigner that identifies neighboring nodes with higher temperatures than the router node, identifies pressure values associated with such neighboring nodes, identifies the minimum of the identified pressures values, compares the minimum pressure value identified to the neighborhood-utilization value of the router node, setting the pressure value of the router node to the neighborhood-utilization value if the neighborhood-utilization value is greater than or equal to the minimum identified pressure value then, and setting the pressure value of the router node to the minimum identified pressure value if the minimum identified pressure value is greater than the neighborhood-utilization value.

3. A method of routing traffic in a mobile mesh network, comprising the steps of:
  a. receiving a graph of a mesh network, where the network includes at least one node of a first type and at least one node of a second type, where the node of the first type is a router node, where the node of the second type is a gateway node, and where nodes are neighbors if they can communicate with each other;
  b. assigning a maximum user-definable temperature value to each gateway node;
  c. calculating a temperature for each router node, where the temperature value for each router node is the highest temperature of a neighboring node times a user-definable conductivity value;
  d. determining a self-utilization value for each router node and each gateway node, where the self-utilization value for each node is a user-definable percentage of a time that the node spends transmitting, receiving, and waiting while its neighbor node is transmitting;
  e. determining a neighborhood-utilization value for each router node, where the neighborhood-utilization value for each router node is a maximum of the router node's self-utilization value and the self utilization values of all of its neighbor nodes, if any;
  f. determining a pressure value for each gateway node, where the pressure value for each gateway node is the gateway node's self-utilization value;
  g. determining a pressure value for each router node, where the pressure value for each router node is a function of the router node's neighborhood-utilization value and pressure values of the router node's neighbor nodes that have higher temperature values than the router node's temperature value;
  h. identifying a router node that was sent traffic from a mobile device;
  i. identifying each node in the mesh network that is a neighbor node of the router node identified in the most recently performed last step that has a higher temperature than the router node;
  j. identifying the node identified in step (i) that has the lowest pressure value;
  k. sending traffic from the router node involved in step (i) to the node identified in step (j); and
  l. stopping if the node to which traffic was sent in step (k) is a gateway node, otherwise identifying the node identified in step (j) as a router node and returning to step (i).

4. The method of claim 2, wherein said step of determining a pressure value for each router node is comprised of the step of determining a pressure value for each router node by identifying neighboring nodes with higher temperatures than the router node, identifying pressure values associated with such neighboring nodes, identifying the minimum of the identified pressures values, comparing the minimum pressure value identified to the neighborhood-utilization value of the router node, setting the pressure value for the router node to the neighborhood-utilization value if the neighborhood-utilization value is greater than or equal to the minimum identified pressure value, and setting the pressure value for the router node to the minimum identified pressure value if the minimum identified pressure value is greater than the neighborhood-utilization value.

* * * * *